United States Patent
Matsen et al.

(10) Patent No.: US 10,618,230 B2
(45) Date of Patent: Apr. 14, 2020

(54) THERMOPLASTIC STRUCTURES

(71) Applicant: The Boeing Company, Chicago, IL (US)

(72) Inventors: Marc Rollo Matsen, Seattle, WA (US); Jeffery Lee Marcoe, Bellevue, WA (US)

(73) Assignee: The Boeing Company, Chicago, IL (US)

( * ) Notice: Subject to any disclaimer, the term of this patent is extended or adjusted under 35 U.S.C. 154(b) by 335 days.

(21) Appl. No.: 13/937,253

(22) Filed: Jul. 9, 2013

(65) Prior Publication Data

US 2015/0013888 A1    Jan. 15, 2015

(51) Int. Cl.
  *B29C 65/70*  (2006.01)
  *B29C 70/44*  (2006.01)
  *B29C 35/08*  (2006.01)
  *B29C 35/02*  (2006.01)
  *B29L 31/30*  (2006.01)
  *B29K 101/12* (2006.01)

(52) U.S. Cl.
  CPC ........ *B29C 70/446* (2013.01); *B29C 35/0272* (2013.01); *B29C 35/0805* (2013.01); *B29C 2035/0811* (2013.01); *B29K 2101/12* (2013.01); *B29L 2031/3076* (2013.01); *Y10T 156/1002* (2015.01)

(58) Field of Classification Search
  CPC ... B29C 65/70; B29C 70/446; B29C 35/0272; B29C 35/0805
  See application file for complete search history.

(56) References Cited

U.S. PATENT DOCUMENTS

| | | | | |
|---|---|---|---|---|
| 2,940,126 A | * | 6/1960 | Sheridan | 264/557 |
| 4,056,596 A | * | 11/1977 | Pahl | B29C 33/52 |
| | | | | 156/155 |
| 4,946,526 A | * | 8/1990 | Petty-Galis | B29C 33/448 |
| | | | | 156/155 |
| 5,019,057 A | * | 5/1991 | Truckai | 604/527 |
| 5,493,940 A | | 2/1996 | Klein | |
| 5,587,098 A | | 12/1996 | Matsen et al. | |
| 5,591,370 A | | 1/1997 | Matsen et al. | |

(Continued)

FOREIGN PATENT DOCUMENTS

| | | |
|---|---|---|
| EP | 0400599 A2 | 12/1990 |
| EP | 2508329 A1 | 10/2012 |

(Continued)

OTHER PUBLICATIONS

International Search Report and Written Opinion, dated Oct. 16, 2014, regarding Application No. PCT/US2014/042467, 11 pages.

(Continued)

*Primary Examiner* — Daniel McNally
(74) *Attorney, Agent, or Firm* — Yee & Associates, P.C.

(57) ABSTRACT

A method of forming a consolidated structure. The method comprises placing a thermoplastic material onto a forming tool to form a structure; positioning the structure within a tool; and consolidating the structure to form the consolidated structure. The tool has a number of die liners configured to generate heat in response to a magnetic field. Consolidating comprises applying a magnetic field to the number of die liners to heat the structure to a consolidation temperature.

24 Claims, 9 Drawing Sheets

(56) References Cited

U.S. PATENT DOCUMENTS

| | | | |
|---|---|---|---|
| 5,624,594 A * | 4/1997 | Matsen et al. | 219/633 |
| 5,645,744 A | 7/1997 | Matsen et al. | |
| 5,683,608 A | 11/1997 | Matsen et al. | |
| 5,710,414 A | 1/1998 | Matsen et al. | |
| 5,728,309 A | 5/1998 | Matsen et al. | |
| 5,772,681 A | 6/1998 | Leoni et al. | |
| 6,039,832 A | 3/2000 | McCarville | |
| 6,156,254 A | 12/2000 | Andrews et al. | |
| 6,180,932 B1 | 1/2001 | Matsen et al. | |
| 6,528,771 B1 * | 3/2003 | Matsen | H05B 6/06 219/634 |
| 6,747,253 B1 | 6/2004 | Firth et al. | |
| 2002/0011509 A1 | 1/2002 | Nelson et al. | |
| 2003/0102070 A1 * | 6/2003 | Black et al. | 156/64 |
| 2004/0082965 A1 * | 4/2004 | Beckham | 606/192 |
| 2004/0104512 A1 * | 6/2004 | Eidenschink | 264/295 |
| 2005/0035115 A1 | 2/2005 | Anderson et al. | |
| 2005/0258575 A1 * | 11/2005 | Kruse | B29C 70/086 264/512 |
| 2006/0289112 A1 | 12/2006 | Holman et al. | |
| 2007/0096368 A1 * | 5/2007 | Hanson | B29C 33/505 264/314 |
| 2008/0302486 A1 * | 12/2008 | Jones | B29C 33/301 156/475 |
| 2010/0170613 A1 | 7/2010 | Kendall et al. | |
| 2010/0269326 A1 | 10/2010 | Allehaux et al. | |
| 2012/0056358 A1 * | 3/2012 | Dixon | B29C 70/446 264/572 |
| 2012/0228467 A1 * | 9/2012 | Wallen et al. | 249/61 |
| 2013/0075529 A1 | 3/2013 | Marcoe | |
| 2013/0082047 A1 | 4/2013 | Matsen et al. | |
| 2017/0297305 A1 | 10/2017 | Matsen et al. | |

FOREIGN PATENT DOCUMENTS

| | | |
|---|---|---|
| JP | H026107 A | 1/1990 |
| JP | 2011098514 A | 5/2011 |

OTHER PUBLICATIONS

Matsen et al., "Induction Heating Using Induction Coils in Series—Parallel Circuits," U.S. Appl. No. 13/248,134, filed Sep. 29, 2011, 25 pages.

Matsen et al., "Metallic Bladders," U.S. Appl. No. 14/324,750, filed Jul. 7, 2014, 107 pages.

International Search Report and Written Opinion, dated Sep. 2, 2014, regarding Application No. PCT/US2014/042495, 7 pages.

Matsen et al., "Thermoplastic Sandwich Structures," U.S. Appl. No. 13/937,269, filed Jul. 9, 2013, 65 pages.

Matsen et al., "Thermoplastic and Titanium Sandwich Structures," U.S. Appl. No. 13/937,285, filed Jul. 9, 2013, 50 pages.

Office Action, dated Jun. 25, 2015, regarding U.S. Appl. No. 13/937,269, 25 pages.

International Search Report and Written Opinion, dated Jan. 30, 2015, regarding Application No. PCT/US2014/045712, 18 pages.

Office Action, dated Sep. 23, 2015, regarding U.S. Appl. No. 13/937,285, 29 pages.

Intellectual Property Office of Great Britain Search and Examination Report, dated Mar. 1, 2018, regarding Application No. GB1520223.7, 1 page.

Intellectual Property Office of Great Britain Search and Examination Report, dated May 8, 2018, regarding Application No. GB1719373.1, 1 page.

Intellectual Property Office of Great Britain Search and Examination Report, dated May 8, 2018, regarding Application No. GB1520223.7, 1 page.

Notice of Allowance, dated Feb. 22, 2018, regarding U.S. Appl. No. 14/606,331, 12 pages.

Intellectual Property Office of Great Britain Examination Report, dated Dec. 19, 2017, Application No. GB1520223.7, 5 pages.

Intellectual Property Office of Great Britain Examination Report, dated Dec. 19, 2017, Application No. GB1719373.1, 5 pages.

Final Office Action, dated Feb. 11, 2016, regarding U.S. Appl. No. 13/937,285, 28 pages.

Notice of Allowance, dated Jun. 13, 2016, regarding U.S. Appl. No. 13/937,285, 15 pages.

Final Office Action, dated Nov. 13, 2015, regarding U.S. Appl. No. 13/937,269, 19 pages.

Notice of Allowance, dated Feb. 5, 2016, regarding U.S. Appl. No. 13/937,269, 14 pages.

Office Action, dated Mar. 31, 2016, regarding U.S. Appl. No. 14/324,750, 36 pages.

Final Office Action, dated Oct. 6, 2016, regarding U.S. Appl. No. 14/324,750, 17 pages.

Notice of Allowance, dated Jan. 27, 2017, regarding U.S. Appl. No. 14/324,750, 7 pages.

Office Action, dated Jul. 18, 2017, regarding U.S. Appl. No. 14/606,331, 43 pages.

Intellectual Property Office of Great Britain Examination Report, dated Jul. 10, 2017, regarding Application No. GB1520223.7, 4 pages.

* cited by examiner

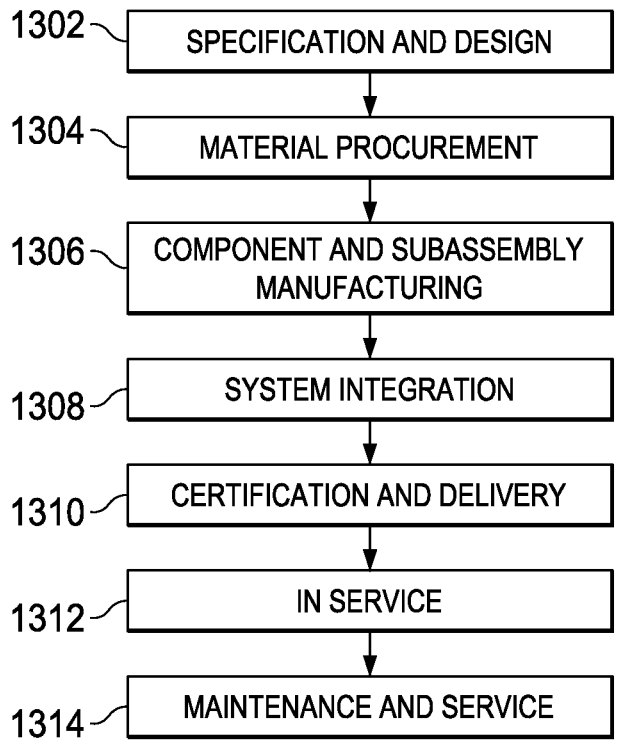
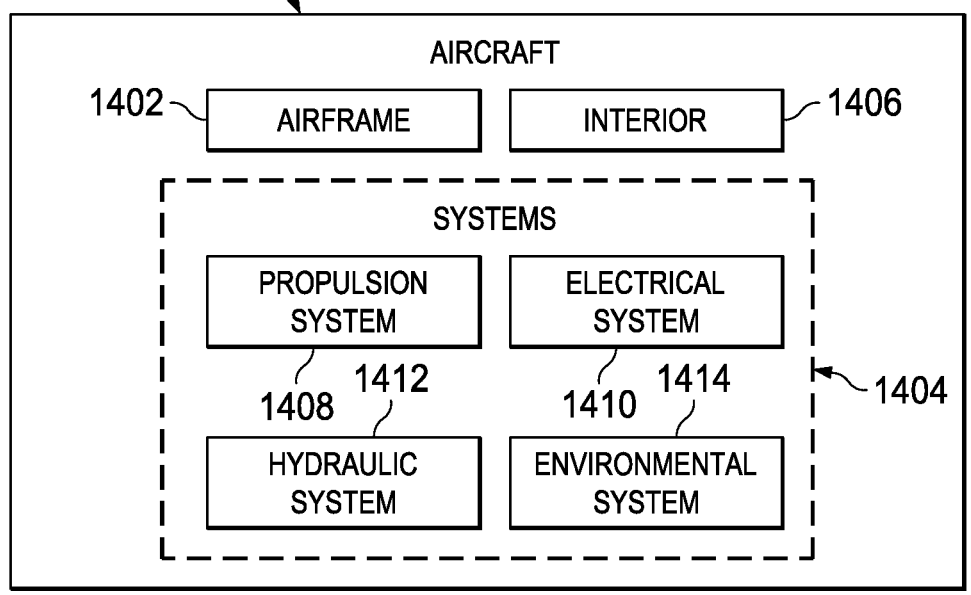

THERMOPLASTIC STRUCTURES

CROSS-REFERENCE TO RELATED APPLICATIONS

This application is related to the following patent applications: entitled "Thermoplastic and Titanium Sandwich Structures," U.S. patent application Ser. No. 13/937,285, filed on Jul. 9, 2013 and issued as U.S. Pat. No. 9,469,087 on Oct. 18, 2016, and "Thermoplastic Sandwich Structures," U.S. patent application Ser. No. 13/937,269 filed on Jul. 9, 2013 and issued as U.S. Pat. No. 9,358,703 on Jun. 7, 2016, filed of even date herewith, each assigned to the same assignee, and each incorporated herein by reference.

BACKGROUND INFORMATION

1. Field

The present disclosure relates generally to the formation of composite structures. More particularly, the present disclosure relates to thermoplastic composite structures. Yet more particularly, the present disclosure relates to a method and apparatus for consolidating a structure comprising a thermoplastic material.

2. Background

Composite materials may be tough, light-weight materials created by combining two or more functional components. For example, a composite material may include reinforcing fibers bound in a polymer resin matrix. Resins used in composite materials may include thermoplastic or thermoset resins. A thermoplastic material may become soft upon heating and may harden upon cooling. A thermoplastic material may be able to be repeatedly heated and cooled. A thermoset material may become hard when heated. The fibers may be unidirectional or may take the form of a woven cloth or fabric.

Currently, composite structures may be created using thermoset materials. However, the time required to create a structure from thermoset materials may be undesirable.

For example, the speed of placing thermoset composite materials may be limited. Further, curing a thermoset material may require several hours. In addition to holding the thermoset material at a curing temperature for several hours, conventional autoclaves using resistive heating to cure thermoset materials may further require several hours for heating up and cooling down.

Consolidating a thermoplastic material may take significantly less time than curing a thermoset material. However, the time for resistive heating during consolidation of thermoplastic material may still be undesirable.

Further, stamp forming of thermoplastic material may currently be used to form non-planar thermoplastic structures. Alternative methods to traditional stamp forming of thermoplastic material may be required to produce thermoplastic structures having non-planar structures, including structures having closed cross-sections. An alternative method of producing a thermoplastic structure may provide improved processing of ply drops, ply additions, and other features of the thermoplastic structure. Improved processing may include improve quality of the resulting thermoplastic structure.

Therefore, it would be desirable to have a method and apparatus that take into account at least some of the issues discussed above, as well as other possible issues. Accordingly, there is a need for a method and assembly for forming non-planar thermoplastic structures. Specifically, there is a need for a method and assembly for consolidating thermoplastic structures having closed cross-sections. Further, there is a need to consolidate the thermoplastic sandwich structures faster than using resistive heating.

SUMMARY

In an illustrative embodiment, a method of forming a consolidated structure is provided. The method comprises placing a thermoplastic material onto a forming tool to form a structure; positioning the structure within a tool; and consolidating the structure to form the consolidated structure. The tool has a number of die liners configured to generate heat in response to a magnetic field. Consolidating comprises applying a magnetic field to the number of die liners to heat the structure to a consolidation temperature.

In another illustrative embodiment, a method of forming a consolidated structure is provided. The method comprises placing a thermoplastic material onto a metallic bladder to form a structure; positioning the structure within a tool; consolidating the structure to form the consolidated structure; and removing the consolidated structure from the tool. The tool has a number of die liners configured to generate heat in response to a magnetic field. Consolidating comprises applying a magnetic field to the number of die liners to heat the structure to a consolidation temperature; pressurizing the metallic bladder such that the metallic bladder imparts a compressive force; and cooling the structure in the tool.

In yet another illustrative embodiment, a method of forming a consolidated structure is provided. The method comprises placing a thermoplastic material onto a mandrel to form a structure; positioning the structure within a tool; consolidating the structure to form the consolidated structure; and removing the consolidated structure from the tool. The tool has a number of die liners configured to generate heat in response to a magnetic field. Consolidating comprises applying a magnetic field to the number of die liners to heat the structure to a consolidation temperature; and cooling the structure in the tool.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 13 is an illustration of an aircraft manufacturing and service method in the form of a block diagram in accordance with an illustrative embodiment; and FIG. 14 is an illustration of an aircraft in the form of a block diagram in which an illustrative embodiment may be implemented.

DETAILED DESCRIPTION

Figure 1:
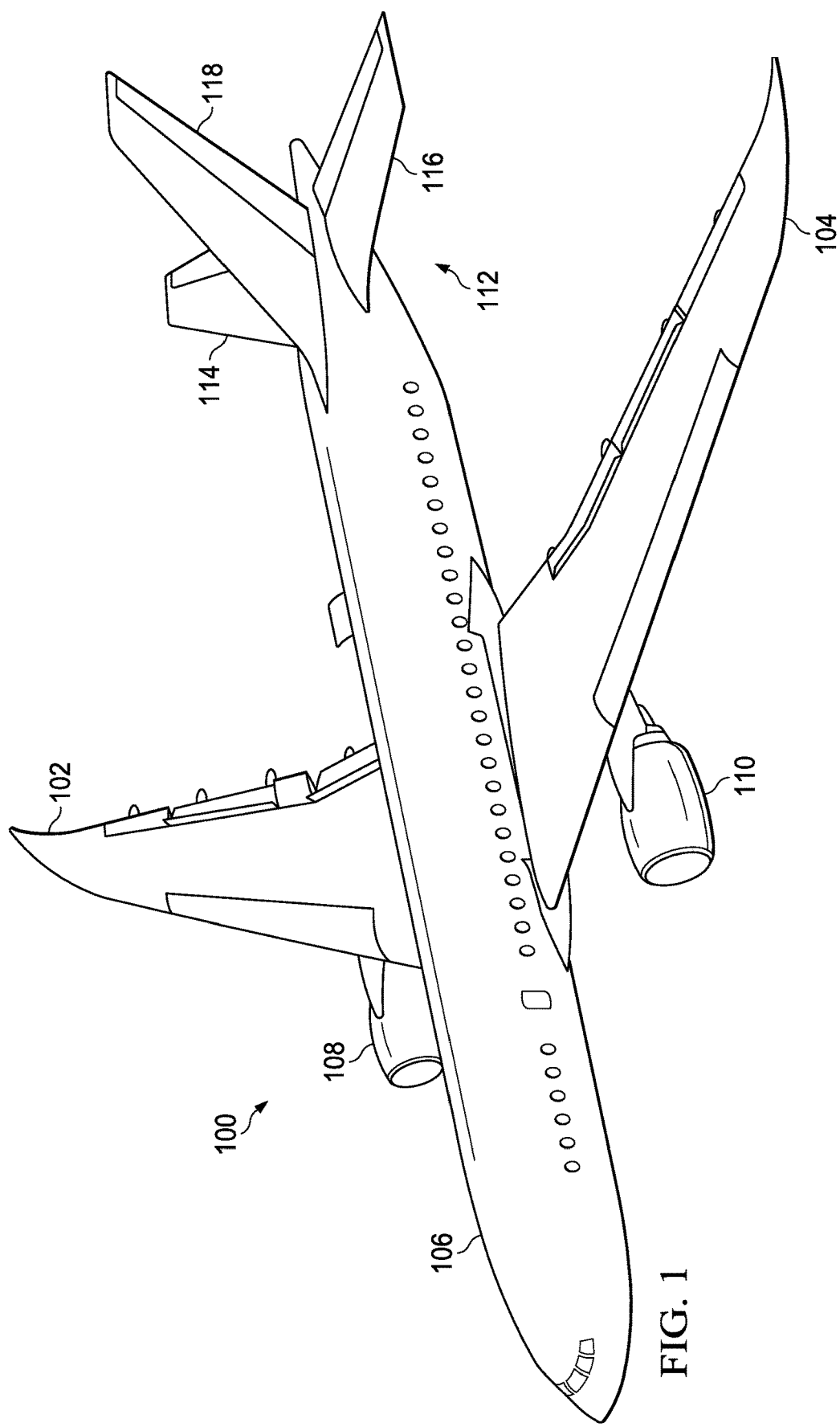
FIG. 1 is an illustration of an aircraft in accordance with an illustrative embodiment may be implemented.

Aircraft are being designed and manufactured with greater and greater percentages of composite materials. Composite materials are used in aircraft to decrease the weight of the aircraft. This decreased weight improves performance features such as payload capacity and fuel efficiency. Further, composite materials provide longer service life for various components in an aircraft.

The different illustrative embodiments recognize and take into account a number of different considerations. For example, the illustrative embodiments recognize and take into account that currently, composite structures may be created using thermoset materials. The illustrative embodiments recognize and take into account that the time required to create a structure from thermoset materials may be undesirable.

For example, thermoset materials may be laid up by hand or by machine to form the shape of the structure. The illustrative embodiments recognize and take into account that the speed of placing composite material may be limited.

Further, the illustrative embodiments recognize and take into account that curing a thermoset material may require several hours. In addition to holding the thermoset material at a curing temperature for several hours, conventional autoclaves using resistive heating to cure thermoset materials may further require several hours for heating up and cooling down.

The different illustrative embodiments recognize and take into account that consolidating a thermoplastic material may take significantly less time than curing a thermoset material. Further, the different illustrative embodiments recognize and take into account that using inductive heating may reduce the time required to consolidate a thermoplastic material or cure a thermoset material. Yet further, the different illustrative embodiments recognize and take into account that using inductive heating may reduce the energy consumed to consolidate a thermoplastic material or cure a thermoset material.

The different illustrative embodiments recognize and take into account that currently, stamp forming of thermoplastic material may be used to form non-planar thermoplastic structures. However, the different illustrative embodiments recognize and take into account that forming a non-planar thermoplastic structure using an alternative method may produce more desirable physical properties in the thermoplastic material of the thermoplastic structure. The illustrative embodiments further recognize that an alternative method may be required to produce thermoplastic structures having closed cross-sections.

Further, the different illustrative embodiments recognize and take into account that producing a thermoplastic structure using an alternative method may reduce the time required to produce the thermoplastic structure. Yet further, the different illustrative embodiments recognize and take into account that an alternative method of producing a thermoplastic structure may provide improved processing of ply drops, ply additions, and other features of the thermoplastic structure.

In manufacturing composite structures, layers of composite material are typically laid up on a tool. The layers may be comprised of fibers in plies. These sheets may take the form of fabrics, tape, tows, or other suitable forms. In some cases, resin may be infused or preimpregnated into the sheets. These types of sheets are commonly referred to as prepreg.

The different layers of prepreg may be laid up in different orientations and different numbers of layers may be used depending on the thickness of the composite structure being manufactured. Different orientations of layers may be used depending on at least one of the expected use and expected load of the composite structure being manufactured. These layers may be laid up by hand or by using automated equipment such as a fiber placement system. After the layers of composite material have been laid up on the tool, the layers of composite material may be consolidated or cured upon exposure to temperature and pressure, thus forming the final composite structure.

The different illustrative embodiments also recognize and take into account that braided composites may provide improved properties over stacked layers of composite tape or tows. For example, the illustrative embodiments recognize and take into account that braided composites may provide improved out of plane loading. Braided composites may comprise fibers which cross over each other, improving the out of plane loading over stacked composite layers. As used herein, "out of plane loads" refer to loads which are not in the plane of the object. For example, loads perpendicular to the surface of a braided composite are out of plane loads. Improved out of plane loading may result in improved damage tolerance. As used herein, improved damage tolerance means improved resistance to damage resulting from impact or other sources.

The different illustrative embodiments also recognize and take into account that using braided composites may reduce composite manufacturing time. For example, the different illustrative embodiments recognize and take into account that braiding equipment may utilize a larger number of spools of composite material at once than conventional composite placement equipment. Accordingly, the different illustrative embodiments recognize that using braiding equipment may reduce manufacturing time.

With reference now to the figures, and in particular, with reference to FIG. 1, an illustration of an aircraft is depicted in accordance with an illustrative embodiment. In this illustrative example, aircraft 100 has wing 102 and wing 104 attached to body 106. Aircraft 100 includes engine 108 attached to wing 102 and engine 110 attached to wing 104.

Body 106 has tail section 112. Horizontal stabilizer 114, horizontal stabilizer 116, and vertical stabilizer 118 are attached to tail section 112 of body 106.

Aircraft 100 is an example of an aircraft in which thermoplastic structures may be implemented in accordance with an illustrative embodiment. In one illustrative example, a structural support such as a spar, rib, or other structural support of wing 104 may comprise a thermoplastic structure. In another illustrative embodiment, a structural support of body 106 may comprise a thermoplastic structure.

The illustration of aircraft 100 in FIG. 1 is not meant to imply physical or architectural limitations to the manner in which an illustrative configuration may be implemented. For example, although aircraft 100 is a commercial aircraft, aircraft 100 may be a military aircraft, a rotorcraft, helicopter, unmanned aerial vehicle, or any other suitable aircraft.

Although the illustrative examples for an illustrative embodiment are described with respect to an aircraft, an illustrative embodiment may be applied to other types of platforms. The platform may be, for example, a mobile platform, a stationary platform, a land-based structure, an aquatic-based structure, and a space-based structure. More specifically, the platform, may be a surface ship, a tank, a personnel carrier, a train, a spacecraft, a space station, a satellite, a submarine, an automobile, a power plant, a bridge, a dam, a house, a windmill, a manufacturing facility, a building, and other suitable platforms.

Figure 2:
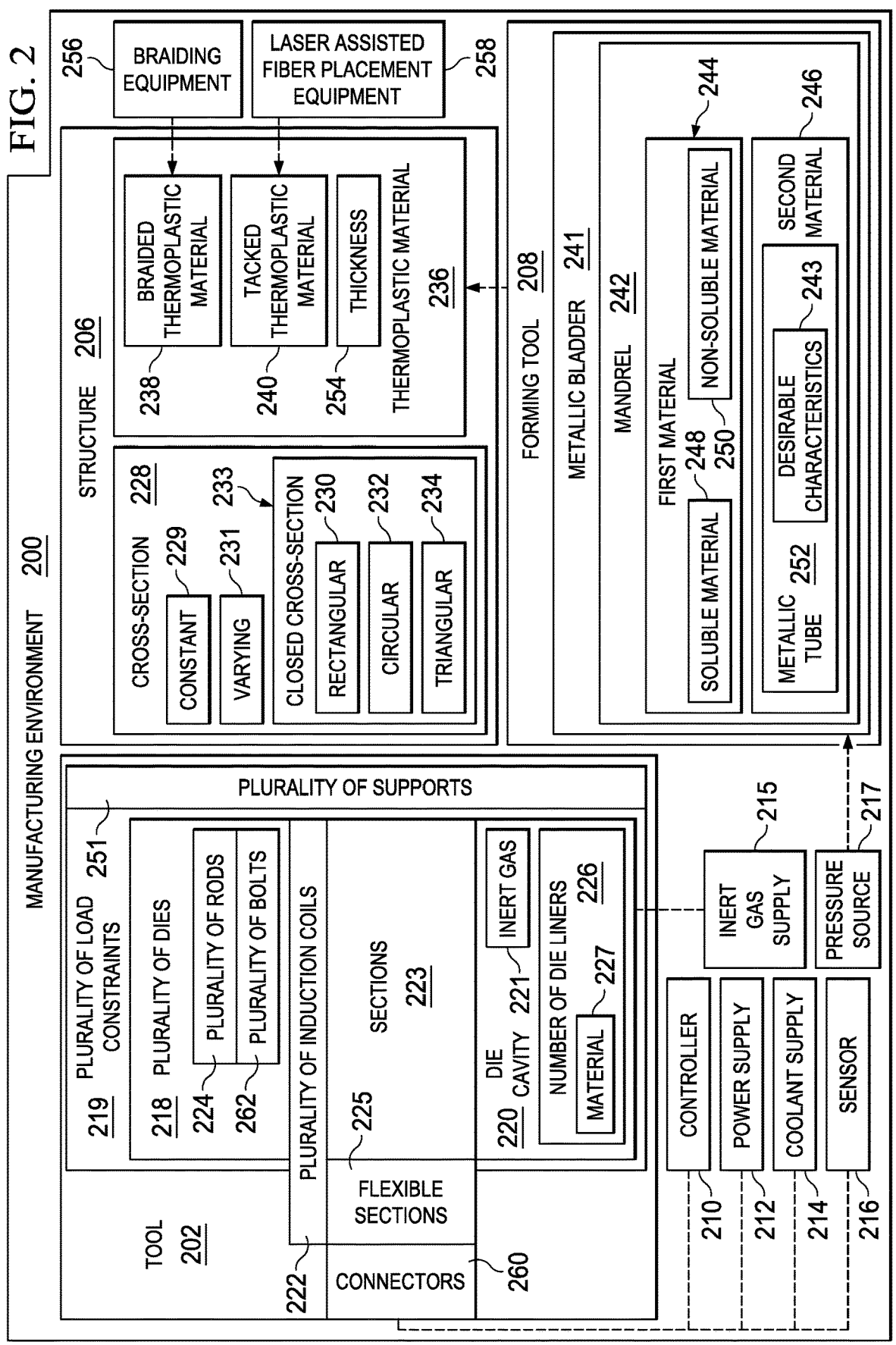
FIG. 2 is an illustration of a block diagram of a manufacturing environment in accordance with an illustrative embodiment.

With reference now to FIG. 2, an illustration of a block diagram of a manufacturing environment is depicted in accordance with an illustrative embodiment. In this illustrative example, manufacturing environment 200 in FIG. 2 is depicted in a block form to illustrate different components for one or more illustrative embodiments. In this depicted example, manufacturing environment 200 includes tool 202, structure 206, forming tool 208, controller 210, power supply 212, coolant supply 214, sensor 216, braiding equipment 256, and laser assisted fiber placement equipment 258.

Tool 202 is configured to consolidate structure 206. As used herein, consolidation comprises applying elevated temperature, elevated pressure, or elevated temperature and pressure to a thermoplastic material such that the resin in thermoplastic material flows. As the resin in the thermoplastic material flows together the reinforcing fibers may stay in substantially the same orientation. As the resin flows it may mix with the resin of nearby thermoplastic materials at the boundaries of the nearby thermoplastic materials. The resin solidifies upon cooling. Consolidation may result in composite materials with a higher quality. Consolidation may result in composite materials with a lower void content. Tool 202 comprises plurality of load constraints 219 supported by plurality of supports 251. Tool 202 also comprises plurality of dies 218 located within plurality of load constraints 219. Die cavity 220 may be a space created by plurality of dies 218. Die cavity 220 may be configured to contain structure 206 during a consolidation process.

Plurality of dies 218 may be formed of a material which is not susceptible to inductive heating. In some illustrative examples, plurality of dies 218 may be formed from a ceramic, a composite, a phenolic, or some other desirable material. In one illustrative example, the material for plurality of dies 218 may be selected based on a coefficient of thermal expansion, thermal shock resistance, and compression strength. In this illustrative example, the material may be selected to have a low coefficient of thermal expansion, desirable thermal shock resistance, and relatively high compression strength. In one illustrative example, plurality of dies 218 may be a castable fused silica ceramic.

As depicted, plurality of dies 218 contain plurality of induction coils 222 and plurality of rods 224. Plurality of induction coils 222 have sections 223 and flexible sections 225. Sections 223 of plurality of induction coils 222 may be embedded in plurality of dies 218. In some illustrative examples, sections 223 may extend along the length of each die of plurality of dies 218. Flexible sections 225 of plurality of induction coils 222 may join sections 223 of different dies in plurality of dies 218. In one illustrative example, flexible sections 225 may have adequate flexibility to move as plurality of dies 218 move. In one illustrative example, flexible sections 225 may have adequate flexibility to move to connect sections 223. Plurality of induction coils 222 may be connected to controller 210, power supply 212, coolant supply 214, and sensor 216 through connectors 260 attached to flexible sections 225.

Controller 210 may be configured to control the input power fed to plurality of induction coils 222 by power supply 212. By controlling the input power, controller 210 may control the magnetic field produced by plurality of induction coils 222. By controlling the magnetic field produced by plurality of induction coils 222, controller 210 may control the operating temperature of tool 202.

Controller 210 may be implemented in software, hardware, firmware or a combination thereof. When software is used, the operations performed by controller 210 may be implemented in program code configured to run on a processor unit. When firmware is used, the operations performed by controller 210 may be implemented in program code and data and stored in persistent memory to run on a processor unit. When hardware is employed, the hardware may include circuits that operate to perform the operations in controller 210.

Coolant supply 214 may be configured to supply coolant to plurality of induction coils 222. Coolant flowing through plurality of induction coils 222 may function as a heat exchanger to transfer heat out of tool 202. Sensor 216 may be configured to measure a temperature of a portion of tool 202 during operation.

Plurality of rods 224 may be embedded within plurality of dies 218. Plurality of rods 224 may provide reinforcement for plurality of dies 218. In one illustrative example, plurality of rods 224 is formed from fiberglass. Plurality of rods 224 may be held in place by a plurality of bolts 262. In some illustrative examples, plurality of rods 224 may extend longitudinally through a die in plurality of dies 218. In some illustrative examples, plurality of rods 224 may extend transversely through a die in plurality of dies 218. In some illustrative examples, plurality of rods 224 may extend both longitudinally and transversely through a die in plurality of dies 218.

Die cavity 220 is associated with inert gas supply 215. During consolidation of structure 206, inert gas 221 may be present in die cavity 220 from inert gas supply 215. In some illustrative examples, inert gas supply 215 may supply inert gas to pressurize metallic bladder 241.

Number of die liners 226 is positioned within die cavity 220. As depicted, number of die liners 226 comprises material 227. Material 227 may be a material configured to generate heat when exposed to a magnetic field. Material 227 may be selected from a metal, a metal alloy, a ceramic, a metalized film, or any other suitable material. In some illustrative examples, number of die liners 226 comprises a metallic alloy having ferromagnetic properties. In some illustrative examples, a ferromagnetic material for number of die liners 226 may be selected based on a desired consolidation temperature. For example, the material for number of die liners 226 may be selected based on a temperature at which a ferromagnetic material becomes non-magnetic. This temperature is also known as a Curie temperature. A ferromagnetic material may be selected for number of die liners 226 such that the Curie temperature for the ferromagnetic material corresponds to a desired consolidation temperature. In these illustrative examples, number of die liners 226 may also be referred to as a number of smart susceptors.

Number of die liners 226 may generate heat when exposed to a magnetic field generated by plurality of induction coils 222. Number of die liners 226 may be used to apply heat to structure 206 during a consolidation process.

Structure 206 has cross-section 228. Cross-section 228 may be constant 229 or varying 231. When cross-section 228 is constant 229, cross-section 228 is the same or substantially the same throughout structure 206. When cross-section 228 is varying 231, at least one characteristic of cross-section 228 changes in at least a portion of structure 206. When cross-section 228 is varying 231, cross-section 228 may change in height, width, shape, or other characteristic. In some illustrative examples, cross-section 228 may be non-planar.

In some illustrative examples, cross-section 228 may be closed cross-section 233. As used herein, a closed cross-section is one for which a structure forms a closed path. Accordingly, structure 206 has closed cross-section 233 when cross-section 228 of structure 206 forms a closed path. Closed cross-section 233 may be rectangular 230, circular 232, or triangular 234.

Following consolidation, structure 206 may be cut to form a plurality of products. Each of the plurality of products may have a cross-section comprising a portion of cross-section 228. In one illustrative example, structure 206 may be cut along a centerline to form two structural supports each having a substantially C-shaped cross-section.

Structure 206 comprises thermoplastic material 236. As used herein, structure 206 may also be referred to as a composite structure. In some illustrative examples, structure 206 may have a non-planar cross-section and may be referred to as a non-planar composite structure. Thermoplastic material 236 may include at least one of braided thermoplastic material 238, tacked thermoplastic material 240, or any other suitable thermoplastic material. Thermoplastic material 236 has thickness 254. Thickness 254 may be constant or varying throughout structure 206. For example, thermoplastic material 236 may have ply drops or ply additions which cause thickness 254 to vary. In some illustrative examples, tacked thermoplastic material 240 may be placed onto braided thermoplastic material 238 in select locations causing thickness 254 to vary through structure 206. In some illustrative examples, thermoplastic material 236 may only comprise braided thermoplastic material 238 which causes thickness 254 to be constant.

Forming tool 208 may take the form of at least one of metallic bladder 241, mandrel 242, or any other suitable forming tool. As used herein, the phrase "at least one of," when used with a list of items, means different combinations of one or more of the listed items may be used and only one of each item in the list may be needed. For example, "at least one of item A, item B, and item C" may include, without limitation, item A or item A and item B. This example also may include item A, item B, and item C or item B and item C. The item may be a particular object, thing, or a category. In other words, at least one of means any combination of items and number of items may be used from the list but not all of the items in the list are required.

In some illustrative examples, forming tool 208 takes the form of metallic bladder 241. Metallic bladder 241 may be associated with thermoplastic material 236. In some illustrative examples, metallic bladder 241 may be placed within thermoplastic material 236. In some illustrative examples, thermoplastic material 236 may be placed onto metallic bladder 241. Thermoplastic material 236 may be placed onto metallic bladder 241 using a variety of composite layup techniques. Thermoplastic material 236 may be placed onto metallic bladder 241 using at least one of braiding, tape layup, tow layup, or any other desirable composite layup process. In one illustrative example, braided thermoplastic material 238 may be placed onto metallic bladder 241 using braiding equipment 256. In one illustrative example, tacked thermoplastic material 240 may be placed onto metallic bladder 241 or onto braided thermoplastic material 238 already on metallic bladder 241 using laser assisted fiber placement equipment 258.

Metallic bladder 241 may be formed from a material exhibiting desirable characteristics 243. Desirable characteristics 243 for metallic bladder 241 may include an ability to hold pressure, thermal stability, flexibility, conformity, and thermal expansion characteristics. For example, it may be desirable for material of metallic bladder 241 to be thermally stable at consolidation temperatures for structure 206. During consolidation, metallic bladder 241 may be pressurized such that metallic bladder 241 imparts a compressive force. When thermoplastic material 236 is braided thermoplastic material 238, slits of braided thermoplastic material 238 may move relative to each other. This movement of braided thermoplastic material 238 may occur when metallic bladder 241 expands under pressure. Movement of braided thermoplastic material 238 may improve the quality of resulting structure 206.

Additionally, it may be desirable for material of metallic bladder 241 to be flexible to provide an even distribution of pressure. Further, it may be desirable for material of metallic bladder 241 to be conformable in order to conform to ply drops or other features of structure 206. Yet further, it may be desirable for material of metallic bladder 241 to have thermal expansion characteristics to allow for removal of metallic bladder 241 following consolidation.

In some illustrative examples, metallic bladder 241 may be formed of aluminum or an aluminum alloy. In some illustrative examples, metallic bladder 241 may be formed of magnesium or a magnesium alloy. In other illustrative examples, other metallic materials than aluminum or magnesium may provide desirable characteristics 243 such as an ability to hold pressure, thermal stability, flexibility, conformity, and thermal expansion characteristics.

Metallic bladder 241 is associated with pressure source 217. Pressure source 217 is configured to pressurize metallic bladder 241 during consolidation of structure 206 in tool 202.

In some illustrative examples, forming tool 208 may take the form of mandrel 242. Mandrel 242 may comprise first material 244 and second material 246. In some illustrative examples, second material 246 may be optional. In these illustrative examples, mandrel 242 may only comprise first material 244. In some illustrative examples, mandrel 242 may comprise both first material 244 and second material 246. First material 244 may comprise non-soluble material 250 or soluble material 248. In one illustrative example, soluble material 248 may be soluble in water. In this illustrative example, soluble material 248 may be selected from at least one of a ceramic, a graphite, or other suitable material which is soluble in water. Non-soluble material 250 may comprise a metal, an alloy, or other suitable material. In one illustrative example, non-soluble material 250 may comprise aluminum. In some illustrative examples, first material 244 of mandrel 242 may have a solid cross-section. In some illustrative examples, first material 244 of mandrel 242 may have a hollow cross-section.

Second material 246 is a material configured to generate heat in response to a magnetic field. In some illustrative examples, second material 246 comprises a metallic alloy having ferromagnetic properties. In some illustrative examples, a ferromagnetic material for second material 246 may be selected based on at least one of a desired consolidation temperature and the Curie temperature of number of die liners 226. For example, the material for second material 246 may be selected based on a temperature at which number of die liners 226 becomes non-magnetic. A ferromagnetic material may be selected for second material 246 such that second material 246 generates heat after number of die liners 226 becomes non-magnetic. In these illustrative examples, second material 246 may also be referred to as a plurality of smart susceptors. Second material 246 may be selected from alloy 510, Invar, Kovar, Moly Permalloy, or any other suitable material that generates heat when exposed to a magnetic field. Alloy 510 may also be known as Phosphor Bronze.

In some illustrative examples, second material 246 may be embedded within first material 244 in mandrel 242. In one illustrative example, second material 246 may take the form of metallic tube 252 within first material 244.

In some illustrative examples, forming tool 208 may take the form of mandrel 242 and metallic bladder 241. In these illustrative examples, metallic bladder 241 may substantially surround mandrel 242. In other words, metallic bladder 241 may be between mandrel 242 and structure 206. In these illustrative examples, mandrel 242 may provide rigidity to forming tool 208. During consolidation, metallic bladder 241 may provide pressure to structure 206 from forming tool 208.

The illustration of manufacturing environment 200 in FIG. 2 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, plurality of rods 224 may instead be formed of a material other than fiberglass. In this example, a plurality of reinforcing rods may be formed of a material which is preferably not electrically conductive. In another example, the plurality of reinforcing rods may be formed of an electrically conductive material and arranged such that they are not susceptible to induction heating.

As another example, instead of thermoplastic material 236, structure 206 may comprise a thermoset material. Although tool 202 is described above as performing a consolidating process, in this illustrative example, tool 202 may be used to perform a curing process of the thermoset material.

As a further example, cross-section 228 may be an open cross-section or a substantially closed cross-section. For example, cross-section 228 may be a V-shape or a U-shape.

As yet a further example, thermoplastic material 236 may be a thermoplastic material other than braided thermoplastic material 238 or tacked thermoplastic material 240. For example, thermoplastic material 236 may comprise thermoplastic composite tape which is not tacked.

Figure 3:
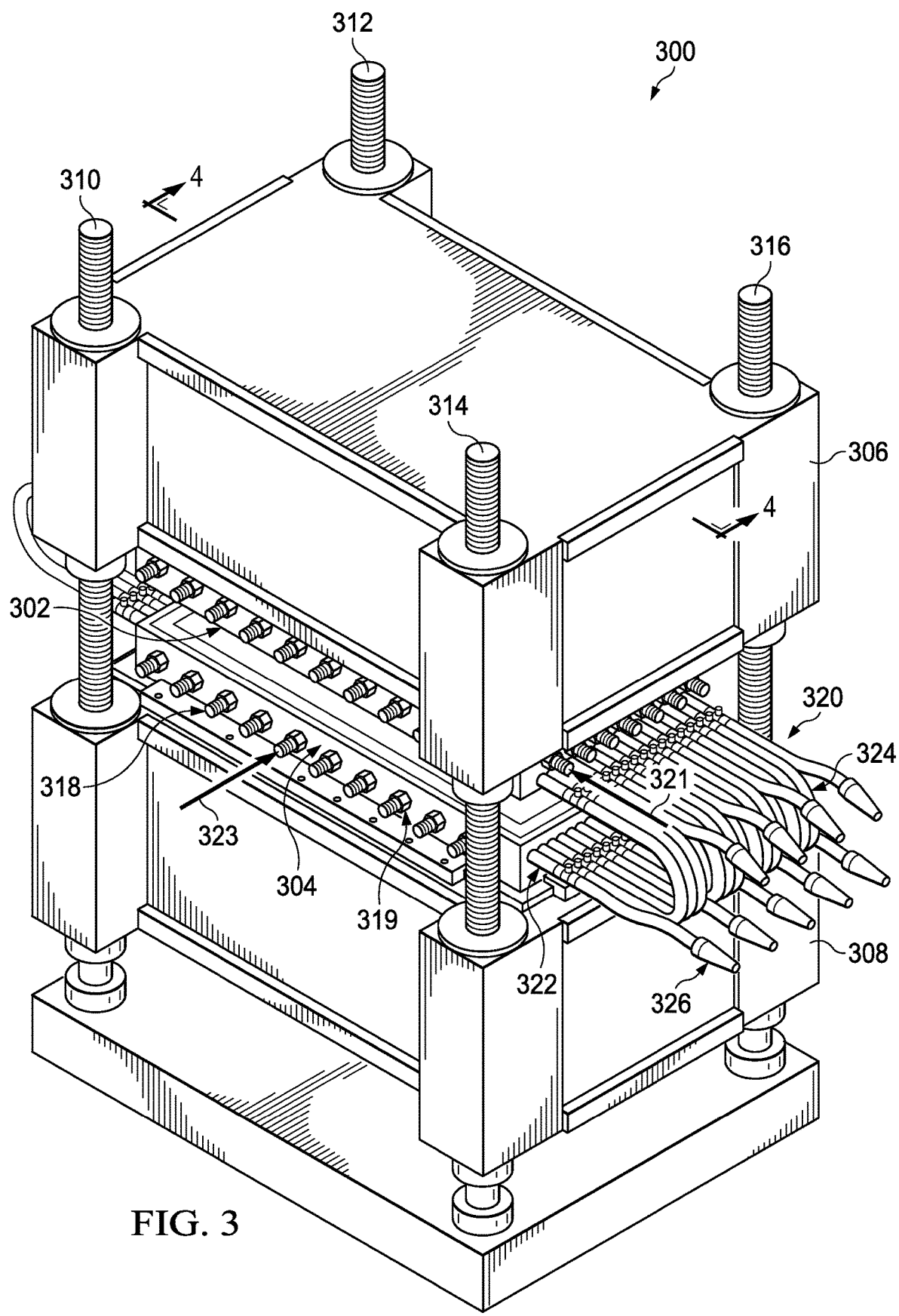
FIG. 3 is an illustration of a perspective view of a tool in accordance with an illustrative embodiment.

Turning now to FIG. 3, an illustration of a perspective view of a tool is depicted in accordance with an illustrative embodiment. In this depicted example, tool 300 is an example of a physical implementation for tool 202 and components in tool 202 in FIG. 2.

In this illustrative example, tool 300 includes first die 302 and second die 304. First die 302 and second die 304 may be a physical implementation of plurality of dies 218 of FIG. 2. As depicted, first die 302 is mounted within load constraint 306 and second die 304 is mounted within load constraint 308. Load constraint 306 and load constraint 308 may be a physical implementation of plurality of load constraints 219 of FIG. 2. First die 302 and second die 304 may be attached to load constraint 306 and load constraint 308, respectively, by any suitable fastening device such as bolting or clamping.

As depicted, load constraint 306 and load constraint 308 are mounted on column support 310, column support 312, column support 314, and column support 316. Column support 310, column support 312, column support 314, and column support 316 may be a physical implementation of plurality of supports 251 of FIG. 2. Load constraint 306 and load constraint 308 provide backing surfaces for first die 302 and second die 304. Load constraint 306 and load constraint 308 may prevent first die 302 and second die 304 from bending and cracking during manufacturing operations. Load constraint 306 and load constraint 308 may be formed from steel, aluminum, or any other desirable material. Material for load constraint 306 and load constraint 308 may be selected based on the loads present during forming or consolidation. In some illustrative examples, the material may be nonmagnetic to reduce any distortion to the magnetic field produced by plurality of induction coils 320. In some illustrative examples, load constraint 306 and load constraint 308 may not be present. In these illustrative examples, first die 302 and second die 304 may be strong enough to prevent bending or cracking.

First die 302 and second die 304 are reinforced with plurality of rods 318 that are held with plurality of bolts 319. Plurality of rods 318 may be a physical implementation of plurality of rods 224 of FIG. 2. Plurality of bolts 319 may be a physical implementation of plurality of bolts 262 of FIG. 2. Plurality of rods 318 extends both longitudinally 321 and transversely 323 in a grid through first die 302 and second die 304.

Plurality of induction coils 320 are associated with first die 302 and second die 304. Plurality of induction coils 320 may be a physical implementation of plurality of induction coils 222 of FIG. 2. Plurality of induction coils 320 comprises sections 322 and flexible sections 324. As depicted, sections 322 extend along the length of first die 302 and second die 304. Sections 322 may be embedded in first die 302 and second die 304. Sections 322 may be a physical implementation of sections 223 of FIG. 2. Flexible sections 324 join sections 322 in first die 302 and second die 304. Flexible sections 324 may be a physical implementation of flexible sections 225 of FIG. 2. Connectors 326 located at the ends of plurality of induction coils 320 may connect plurality of induction coils 320 to a controller, power source, coolant supply, or other external utility. Connectors 326 may be a physical implementation of connectors 260 of FIG. 2.

The illustration of tool 300 in FIG. 3 is not meant to imply physical or architectural limitations to the manner in which an illustrative embodiment may be implemented. Other components in addition to or in place of the ones illustrated may be used. Some components may be unnecessary.

For example, plurality of rods 318 may extend in only one direction within first die 302 and second die 304. As another example, although only first die 302 and second die 304 are depicted, tool 300 may instead have three or more dies.

Figure 4:
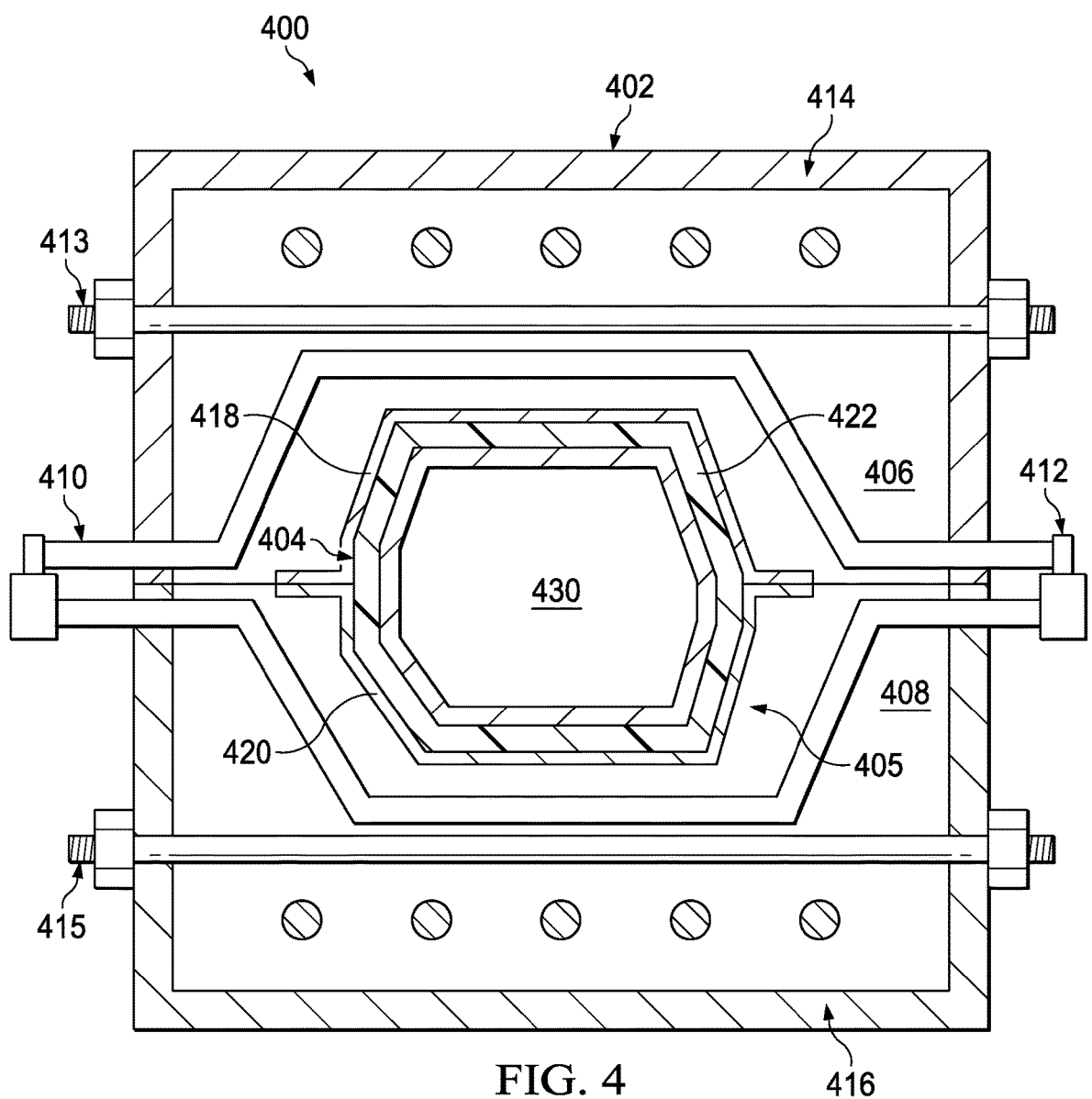
FIG. 4 is an illustration of a cross-sectional view of a structure within a tool in accordance with an illustrative embodiment.

Turning now to FIG. 4, an illustration of a cross-sectional view of a structure within a tool is depicted in accordance with an illustrative embodiment. View 400 may be a cross-sectional view of a structure within tool 300 of FIG. 3. Specifically, view 400 may be a cross-sectional view of a structure within tool 300 of FIG. 3 along lines 4-4. Tool 402 may be a physical implementation of tool 202 in FIG. 2. Structure 404 may be a physical implementation of structure 206 in FIG. 2.

As depicted, structure 404 is positioned within tool 402. Specifically, structure 404 is positioned between first die 406 and second die 408 within die cavity 405 of tool 402. Plurality of induction coils 410 runs through first die 406 and second die 408. Plurality of induction coils 410 are joined by flexible sections 412. Plurality of rods 413 runs through first die 406. Plurality of rods 415 runs through second die 408. First die 406 and second die 408 are held within load constraint 414 and load constraint 416.

Die liner 418 is associated with first die 406 within die cavity 405. Die liner 420 is associated with second die 408 in die cavity 405. Die liner 418 and die liner 420 contact structure 404 within die cavity 405.

Structure 404 comprises thermoplastic material 422. Thermoplastic material 422 may be formed using one or more composite layup processes. The one or more composite layup processes may be selected from at least one of braiding, tape layup, tow layup, or any other desirable composite layup process. In some illustrative examples, thermoplastic material 422 may be placed on metallic bladder 430 through a braiding process. Braided composite material may be laid down using braiding equipment such as braiding equipment 256 of FIG. 2. In one illustrative example, composite material may be braided directly onto metallic bladder 430 to form thermoplastic material 422.

In some illustrative examples, thermoplastic material 422 may be placed on metallic bladder 430 through a tape layup process. In one illustrative example, the tape layup process may lay composite material directly onto metallic bladder 430. In some illustrative examples, the composite layup process may be a laser assisted fiber placement process. In these illustrative examples, thermoplastic composite material may be laid down using laser assisted fiber placement equipment such as laser assisted fiber placement equipment 258 of FIG. 2. Laser assisted fiber placement equipment may tack portions of the thermoplastic composite material using the laser as the thermoplastic composite material is laid down. By laser tacking the thermoplastic composite material, the plies of thermoplastic composite material may substantially maintain their positions relative to each other.

In some illustrative examples, thermoplastic material 422 may be placed on metallic bladder 430 as a preform. In this illustrative example, thermoplastic material 422 may be formed to a desired shape prior to being placed on metallic bladder 430. In some illustrative examples, thermoplastic material 422 may be consolidated or semi rigid as thermoplastic material 422 is placed on metallic bladder 430. In some illustrative examples, the preform may be created using laser assisted fiber placement equipment.

In yet other illustrative examples, thermoplastic material 422 may comprise braided thermoplastic material braided onto metallic bladder 430 and tacked thermoplastic material placed onto the braided thermoplastic material. In other illustrative examples, thermoplastic material 422 may comprise thermoplastic material braided over tacked thermoplastic material, the tacked thermoplastic material placed directly onto metallic bladder 430. In other illustrative examples, thermoplastic material 422 may be placed on the metallic bladder 430 by a hand layup process.

To consolidate structure 404, power may be supplied to plurality of induction coils 410 to produce a magnetic field. In response to the magnetic field, die liner 418 and die liner 420 may generate heat.

Metallic bladder 430 may be pressurized. Metallic bladder 430 is positioned within structure 404 such that metallic bladder 430 contacts thermoplastic material 422 of structure 404. When pressurized, metallic bladder 430 may impart a compressive force to structure 404. When thermoplastic material 422 is a braided thermoplastic material, slits of thermoplastic material 422 may move relative to each other. This movement of the braided slits of thermoplastic material 422 may occur when metallic bladder 430 expands under pressure. Movement of the braided slits of thermoplastic material 422 may improve the quality of resulting structure 404. First die 406 and second die 408 define an outer mold line for structure 404. When metallic bladder 430 is pressurized, first die 406 and second die 408 provide resistant pressure. In other words, first die 406 and second die 408 may provide a substantially rigid outer mold line for structure 404.

As structure 404 is heated and compressed, thermoplastic material 422 is consolidated. During heating and compression, resin of thermoplastic material 422 flows and solidifies.

The illustration of FIG. 4 is not meant to imply physical or architectural limitations to the manner in which an illustrative embodiment may be implemented. Other components in addition to or in place of the ones illustrated may be used. Some components may be unnecessary.

For example, rather than metallic bladder 430, composite material may be laid up on a mandrel to form structure 404. In one illustrative example, a mandrel within structure 404 may comprise a soluble material. In one illustrative example, a soluble material may be soluble in water. In this illustrative example, a soluble material may be selected from at least one of a ceramic, a graphite, or other suitable material which is soluble in water. In another illustrative example, a mandrel within structure 404 may comprise a non-soluble material. In yet another illustrative example, a mandrel within structure 404 may comprise both a soluble material and a second material configured to generate heat in response to a magnetic field. In one illustrative example, a soluble material may be soluble in water. In this illustrative example, a soluble material may be selected from at least one of a ceramic, a graphite, or other suitable material which is soluble in water. In some illustrative examples, the material of the mandrel may expand during heating to apply pressure to structure 404.

In other illustrative examples, a metallic bladder may be positioned over a mandrel. While the metallic bladder is over the mandrel, composite material may be laid up over the metallic bladder. As a result, both a metallic bladder and a mandrel may be present within structure 404 during consolidation. In these illustrative examples, the mandrel may provide support for moving structure 404 prior to consolidation. The metallic bladder may provide pressure during consolidation of structure 404.

Figure 5:
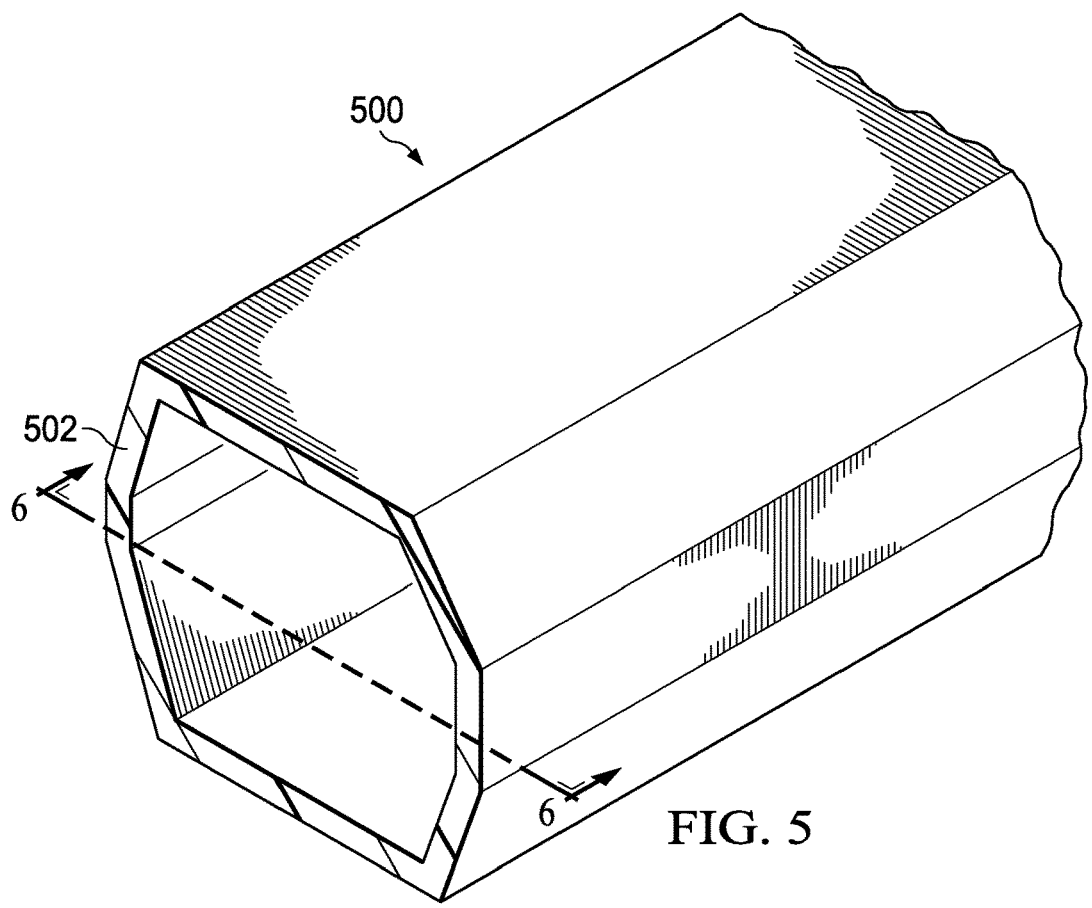
FIG. 5 is an illustration of a structure produced in accordance with an illustrative embodiment.

Turning now to FIG. 5, an illustration of a structure produced is depicted in accordance with an illustrative embodiment. Structure 500 may be a physical embodiment of structure 206 formed using tool 202 of FIG. 2. Structure 500 may be a physical embodiment of structure 404 of FIG. 4 following consolidation in tool 402 and removal of metallic bladder 430. Structure 500 may comprise a duct or structural stiffener for aircraft 100 of FIG. 1. Additionally, structure 500 may be cut into two structural stiffeners for wing 104 of aircraft 100 of FIG. 1.

As depicted in FIG. 5, structure 500 comprises a substantially constant thickness of composite material. Additionally, as depicted, structure 500 has a substantially constant cross-section throughout structure 500. However, in other illustrative examples, structure 500 may have a varying composite material thickness. For example, structure 500 may have ply drops-offs, ply additions, ramp ups, ramp downs, or other changes in the number or location of plies causing varying composite material thickness. In another illustrative example, structure 500 may have a varying cross-section. In some illustrative examples, structure 500 may be used in an aircraft or other platform after consolidation. In other illustrative examples, structure 500 may be cut to produce a plurality of products. Each of the plurality of products will comprise a portion of cross-section 502 of structure 500.

Figure 6:
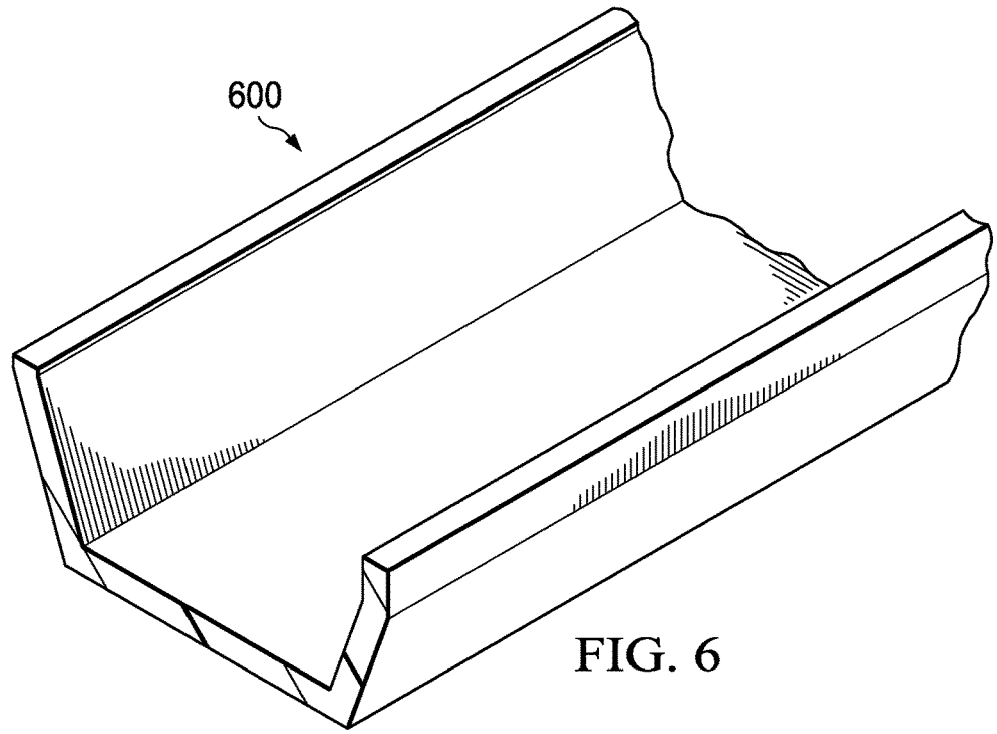
FIG. 6 is an illustration of a product created from a structure in accordance with an illustrative embodiment.

Turning now to FIG. 6, an illustration of a product created from a structure is depicted in accordance with an illustrative embodiment. Specifically, product 600 may be a physical embodiment of a product formed by cutting structure 500 of FIG. 5 along line 6-6. Product 600 may be a physical embodiment of a product formed by cutting structure 206 of FIG. 2. Product 600 may be a structural stiffener for wing 104 of aircraft 100 of FIG. 1. Cutting product 600 from structure 500 may produce product 600 more quickly than individually stamp forming product 600.

Figure 7:
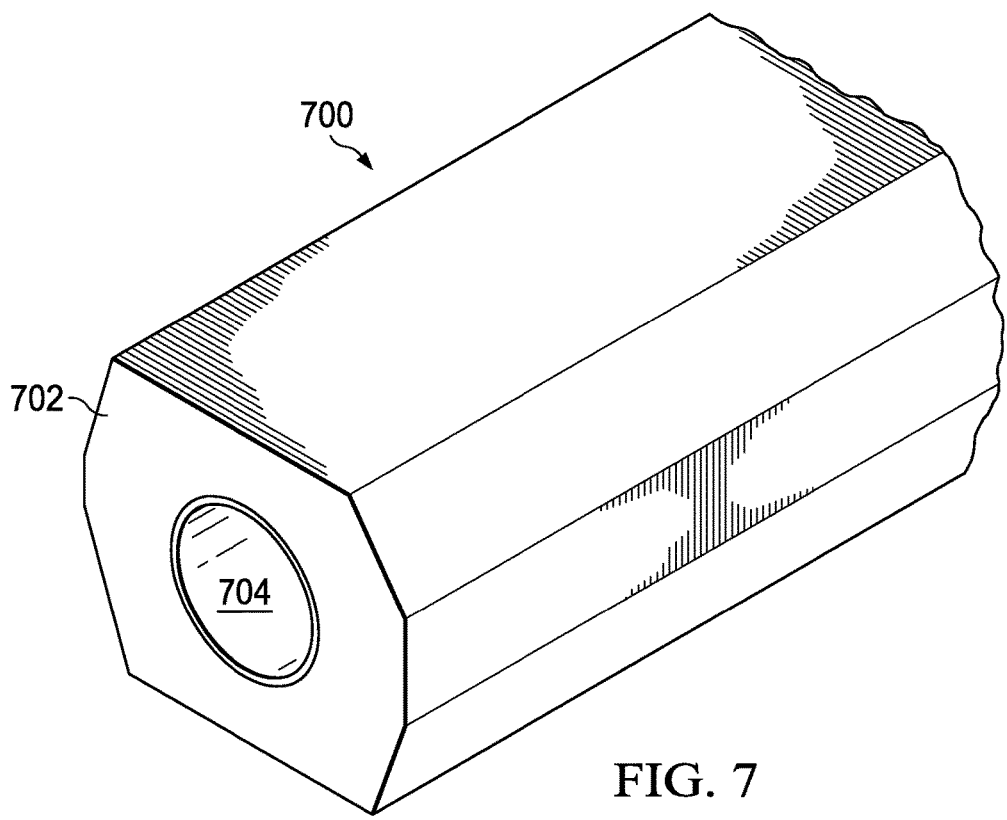
FIG. 7 is an illustration of a perspective view of a mandrel in accordance with an illustrative embodiment.

Turning now to FIG. 7, an illustration of a perspective view of a mandrel is depicted in accordance with an illustrative embodiment. In this depicted example, mandrel 700 is an example of a physical implementation of mandrel 242 of FIG. 2. Specifically, mandrel 700 may be mandrel 242 of FIG. 2 comprising first material 244 in the form of soluble material 248 and second material 246 in the form of metallic tube 252. Mandrel 700 may be used to manufacture an aircraft part such as a structural stiffener of wing 104 of aircraft 100 of FIG. 1.

As depicted, mandrel 700 has a substantially constant cross-section. In some illustrative examples, mandrel 700 may have varying cross-sectional features. The cross-section of mandrel 700 may change in height, width, shape, or other characteristic along mandrel 700. In some illustrative examples, mandrel 700 may have a different cross-sectional shape than the shape depicted. In one illustrative example, mandrel 700 may have a circular cross-sectional shape. In another illustrative example, mandrel 700 may have a triangular cross-sectional shape. Mandrel 700 comprises first material 702 formed into a cross-sectional shape substantially similar to a desired cross-section of a resulting structure.

Mandrel 700 also comprises second material 704 formed into a tube. First material 702 comprises a soluble material. In one illustrative example, a soluble material may be soluble in water. In this illustrative example, a soluble material may be selected from at least one of a ceramic, a graphite, or other suitable material which is soluble in water. Second material 704 comprises a material configured to generate heat in response to a magnetic field. In some illustrative examples, second material 704 is Invar. Second material 704 may be selected based on at least one of a desired consolidation temperature and the Curie temperature of the number of die liners to be used. As a result, second material 704 may be Invar when the Curie temperature of Invar is desirable taking into account the desired consolidation temperature and the Curie temperature of the number of die liners. Invar may be selected as second material 704 based on other properties of Invar. Specifically, the coefficient of thermal expansion of Invar may be desirable for use in composite material processing. The coefficient of thermal expansion of Invar may be substantially similar to the coefficient of thermal expansion of composite material.

Second material 704 may provide reinforcement to first material 702. In some illustrative embodiments, second material 704 may increase rigidity of mandrel 700.

Mandrel 700 may act as a forming tool for a thermoplastic material, such as thermoplastic material 236 of FIG. 2. During formation of a structure, composite material may be laid onto mandrel 700. After laying composite material, mandrel 700 may be placed into a tool such as tool 202 of FIG. 2 for consolidation of the composite material. In one illustrative example, braided composite material may be laid onto mandrel 700 to form a structure. In another illustrative example, tacked thermoplastic material may be laid onto mandrel 700 to form a structure. In yet another illustrative example, a combination of braided composite material and tacked composite material may be laid onto mandrel 700 to form a structure. Thus, mandrel 700 may define a cavity in a structure, such as structure 404 of FIG. 4. As a result, mandrel 700 maintains or substantially maintains the shape of the cavity during consolidation.

During consolidation, second material 704 may generate heat in response to a magnetic field generated by a plurality of induction coils, such as plurality of induction coils 222 of FIG. 2. In some illustrative examples, second material 704 may generate heat after heating of a die liner proceeds until the die liner is nearly non-magnetic. This die liner may be a die liner in number of die liners 226 of FIG. 2.

Figure 8:
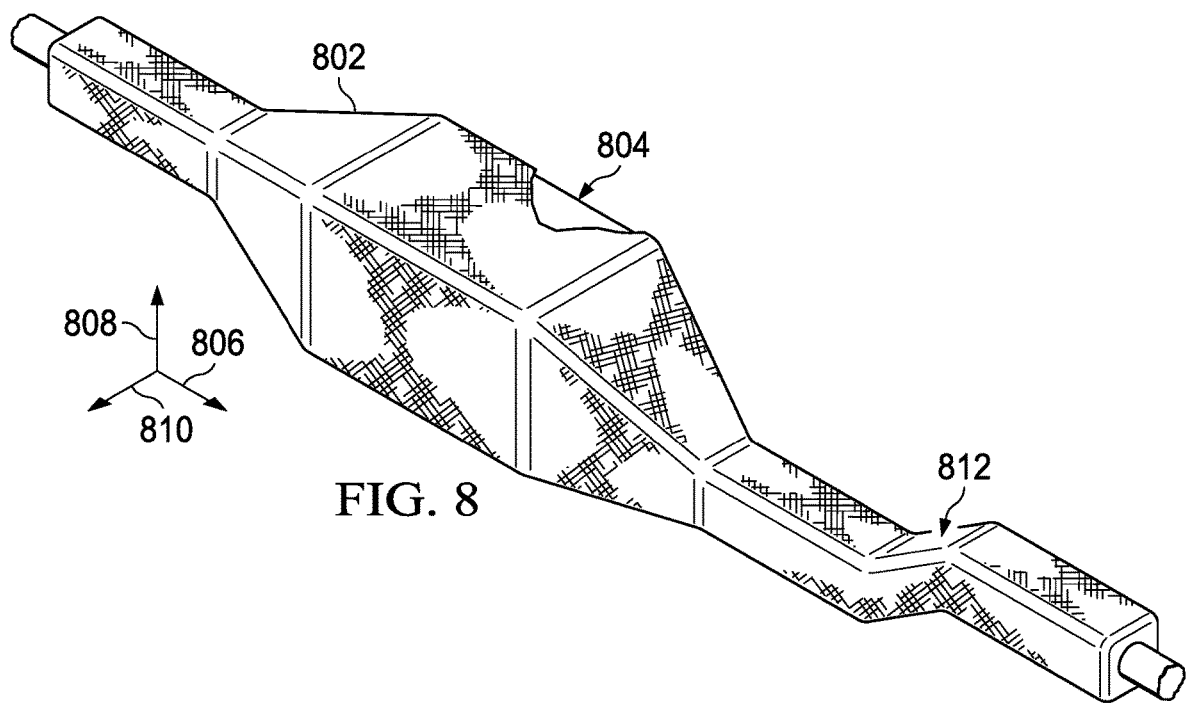
FIG. 8 is an illustration of a braided thermoplastic material over a forming tool in accordance with an illustrative embodiment.

Turning now to FIG. 8, an illustration of a braided thermoplastic material over a forming tool is depicted in accordance with an illustrative embodiment. Braided thermoplastic material 802 may be a physical implementation of braided thermoplastic material 238 of FIG. 2. Mandrel 804 may be a physical implementation of mandrel 242 of FIG. 2.

As depicted, mandrel 804 within braided thermoplastic material 802 comprises a varying cross-section. Specifically, the cross-section of mandrel 804 varies along axis 806. More specifically, the size of cross-section of mandrel 804 varies along axis 806 and includes joggle 812. Yet more specifically, the height along axis 808 and width along axis 810 of mandrel 804 vary along axis 806. In other illustrative examples, cross-section of mandrel 804 may include a change in shape, a twist, a bend, or other desirable change.

In some illustrative examples, after placing braided thermoplastic material 802 onto mandrel 804, tacked thermoplastic material may be added to all or portions of braided thermoplastic material 802. Tacked thermoplastic material may form areas of varying thickness in a resulting structure. After all desired thermoplastic material is placed onto mandrel 804, the mandrel 804 may be placed into a tool such as tool 202 of FIG. 2 for consolidation.

The different components shown in FIG. 1 and FIGS. 3-8 may be combined with components in FIG. 2, used with components in FIG. 2, or a combination of the two. Additionally, some of the components in FIG. 1 and FIGS. 3-8 may be illustrative examples of how components shown in block form in FIG. 2 can be implemented as physical structures.

Figure 9:
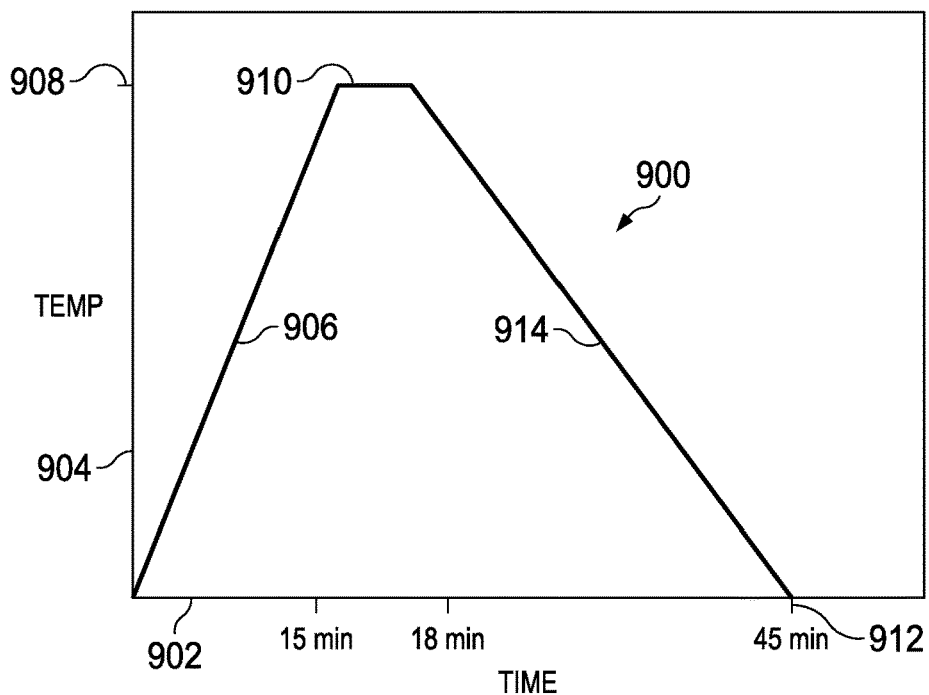
FIG. 9 is an illustration of a temperature cycle in accordance with an illustrative embodiment.

Turning now to FIG. 9, an illustration of a temperature cycle is depicted in accordance with an illustrative embodiment. Temperature cycle 900 may be an illustrative example of a temperature cycle for tool 202 of FIG. 2 in structure 206.

Temperature cycle 900 has x axis 902 and y axis 904. Temperature cycle 900 represents the consolidation of a structure comprising a thermoplastic material in a tool. The tool comprises an inductive heating tool.

X axis 902 represents time in minutes. Y axis 904 represents temperature. In temperature cycle 900, the tool takes approximately 15 minutes, as represented by ramp 906, to heat the structure to consolidating temperature 908. Afterwards, consolidating temperature 908 is held for approximately 3 minutes, as represented by hold 910. Following hold 910, the structure is controllably cooled to room temperature 912, as represented by ramp 914.

In some illustrative examples, the structure is cooled in ramp 914 at a rate to produce desirable material characteristics. For example, the structure may be cooled at a rate to produce a desired degree of crystallinity in the thermoplastic material of the structure. In some illustrative examples, the structure is cooled in ramp 914 at a rate to prevent undesirable material characteristics.

As depicted, temperature cycle 900 for consolidation of the structure in the tool is significantly shorter than curing a thermoset material. Further, as depicted, temperature cycle 900 for consolidation of the structure in the tool may take less time than consolidation using a resistive heating tool. Accordingly, by using temperature cycle 900, manufacturing time of thermoplastic structures may be reduced. Further, by using temperature cycle 900, manufacturing costs may be reduced.

Figure 10:
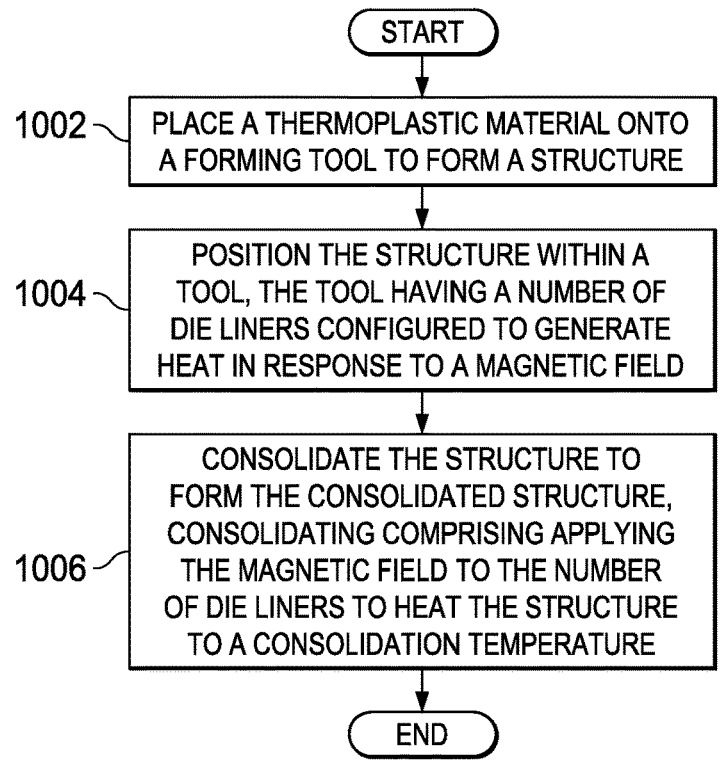
FIG. 10 is an illustration of a flowchart of a process for forming a thermoplastic structure in accordance with an illustrative embodiment.

Turning now to FIG. 10, an illustration of a flowchart of a process for forming a thermoplastic structure is depicted in accordance with an illustrative embodiment. The process illustrated in FIG. 10 may be implemented in manufacturing environment 200 of FIG. 2. Further, this process may be implemented using tool 202 of FIG. 2 to form structure 206 of FIG. 2.

The process may begin by placing a thermoplastic material onto a forming tool to form a structure (operation 1002). In some illustrative examples, placing the thermoplastic material may comprise placing a braided thermoplastic material. In some illustrative examples, placing the thermoplastic material may comprise placing a tacked thermoplastic material. Specifically, in an illustrative example, placing the thermoplastic material may comprise placing a braided thermoplastic material onto a mandrel. In another illustrative example, placing the thermoplastic material may comprise placing a braided thermoplastic material onto a metallic bladder. In yet another illustrative example, placing the thermoplastic material comprises placing a braided thermoplastic material onto a mandrel and placing a tacked thermoplastic material over the braided thermoplastic material on the mandrel, the tacked thermoplastic material laid down using laser assisted fiber placement equipment.

The process may then position the structure within a tool, the tool having a number of die liners configured to generate heat in response to a magnetic field (operation 1004). The number of die liners may be number of die liners 226 of FIG. 2. In some illustrative examples, the forming tool comprises a mandrel and consolidating the structure to form the consolidated structure may also comprise applying the magnetic field to the mandrel.

The process may then consolidate the structure to form the consolidated structure, consolidating comprising applying a magnetic field to the number of die liners to heat the structure to a consolidation temperature (operation 1006). In one illustrative example, the forming tool comprises a metallic bladder and a mandrel, and consolidating the structure to form the consolidated structure further comprises pressurizing the metallic bladder such that the metallic bladder imparts a compressive force. Afterwards, the process terminates.

In some illustrative examples, the process may comprise additional operations. For example, the process may further comprise dissolving a first material of a mandrel from within the consolidated structure. Further, the process may further comprise the forming tool comprising a metallic bladder and a mandrel, and wherein consolidating the structure to form the consolidated structure further comprises pressurizing the metallic bladder such that the metallic bladder imparts a compressive force.

When the thermoplastic material is a braided thermoplastic material, slits of the thermoplastic material may move relative to each other. This movement of the braided slits of thermoplastic material may occur when the metallic bladder expands under pressure. Movement of the braided slits of thermoplastic material may improve the quality of the resulting structure.

Figure 11:
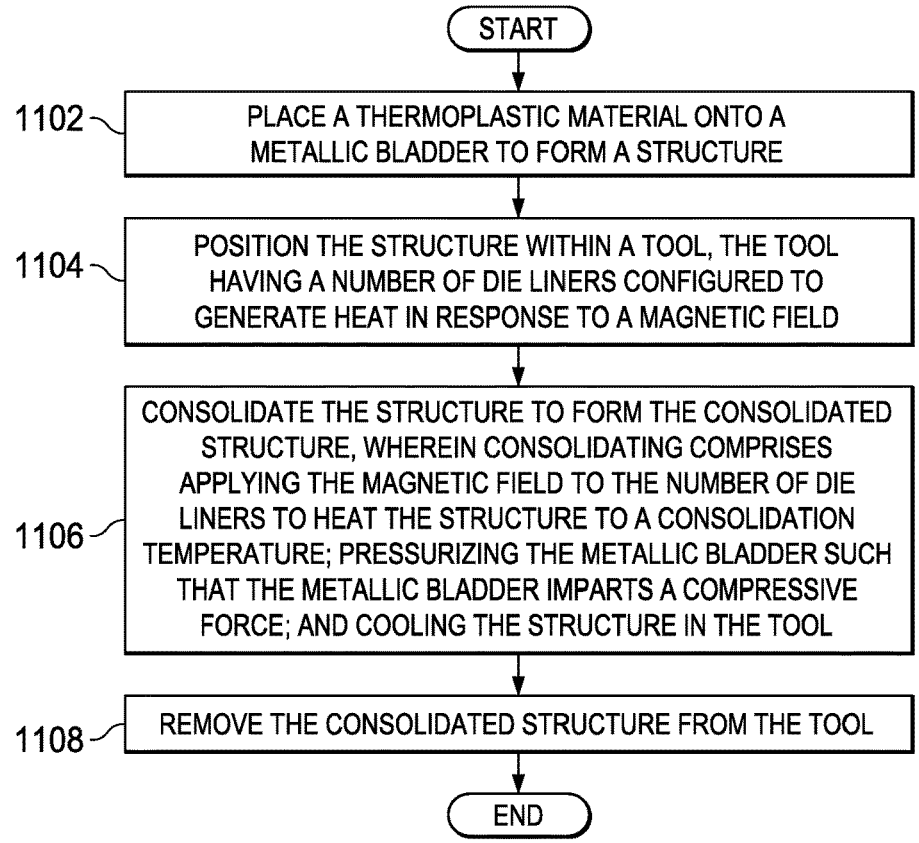
FIG. 11 is an illustration of a flowchart of a process for forming a thermoplastic structure in accordance with an illustrative embodiment.

Turning now to FIG. 11, an illustration of a flowchart of a process for forming a thermoplastic structure is depicted in accordance with an illustrative embodiment. The process illustrated in FIG. 11 may be implemented in manufacturing environment 200 of FIG. 2. Further, this process may be implemented using tool 202 of FIG. 2 to form structure 206 of FIG. 2.

The process may begin by placing a thermoplastic material onto a metallic bladder to form a structure (operation 1102). The process may then position the structure within a tool, the tool having a number of die liners configured to generate heat in response to a magnetic field (operation 1104). The number of die liners may be number of die liners 226 of FIG. 2. The process may then consolidate the structure to form the consolidated structure, wherein consolidating comprises applying a magnetic field to the number of die liners to heat the structure to a consolidation temperature, pressurizing the metallic bladder such that the metallic bladder imparts a compressive force, and cooling the structure in the tool (operation 1106). When the thermoplastic material is a braided thermoplastic material, slits of the thermoplastic material may move relative to each other. This movement of the braided slits of thermoplastic material may occur when the metallic bladder expands under pressure. Movement of the braided slits of thermoplastic material may improve the quality of the resulting structure.

The process may then remove the consolidated structure from the tool (operation 1108). Afterwards, the process terminates.

In some illustrative examples, the process may comprise additional operations. For example, the process may further comprise cutting the consolidated structure to form a plurality of products. In some illustrative examples, placing the thermoplastic material onto the metallic bladder comprises placing a braided thermoplastic material over the metallic bladder. In other illustrative examples, the process may comprise placing a tacked thermoplastic material over the braided thermoplastic material on the metallic bladder, the tacked thermoplastic material laid down using laser assisted fiber placement equipment.

Figure 12:
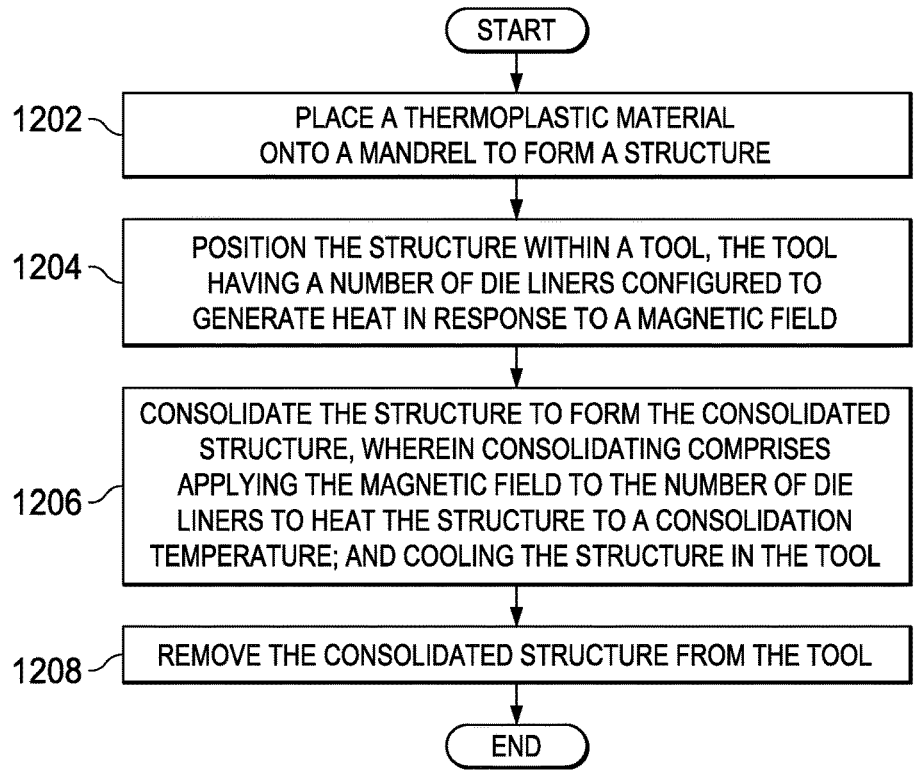
FIG. 12 is an illustration of a flowchart of a process for forming a thermoplastic structure in accordance with an illustrative embodiment.

Turning now to FIG. 12, an illustration of a flowchart of a process for forming a thermoplastic structure is depicted in accordance with an illustrative embodiment. The process illustrated in FIG. 12 may be implemented in manufacturing environment 200 of FIG. 2. Further, this process may be implemented using tool 202 of FIG. 2 to form structure 206 of FIG. 2.

The process may begin by placing a thermoplastic material onto a mandrel to form a structure (operation 1202). The thermoplastic material may comprise at least one of a braided thermoplastic material, a tacked thermoplastic material, or any other suitable thermoplastic material. In one illustrative example, the mandrel comprises a first material that is soluble and a second material that is configured to generate heat in response to the magnetic field.

The process may then position the structure within a tool, the tool having a number of die liners configured to generate heat in response to a magnetic field (operation 1204). The number of die liners may be number of die liners 226 of FIG. 2. The process may then consolidate the structure to form the consolidated structure, wherein consolidating comprises applying a magnetic field to the number of die liners to heat the structure to a consolidation temperature, and cooling the structure in the tool (operation 1206). The process may then remove the consolidated structure from the tool (operation 1208). In some illustrative examples, the process may comprise additional operations. For example, in one illustrative example, the process may further comprise cutting the consolidated structure to form a plurality of products. Afterwards, the process terminates.

Illustrative embodiments of the disclosure may be described in the context of aircraft manufacturing and service method 1300 as shown in FIG. 13 and aircraft 1400 as shown in FIG. 14. Turning first to FIG. 13, an illustration of an aircraft manufacturing and service method is depicted in the form of a block diagram in accordance with an illustrative embodiment. During pre-production, aircraft manufacturing and service method 1300 may include specification and design 1302 of aircraft 1400 in FIG. 14 and material procurement 1304.

During production, component and subassembly manufacturing 1306 and system integration 1308 of aircraft 1400 in FIG. 14 takes place. Thereafter, aircraft 1400 in FIG. 14 may go through certification and delivery 1310 in order to be placed in service 1312. While in service 1312 by a customer, aircraft 1400 in FIG. 14 is scheduled for routine maintenance and service 1314, which may include modification, reconfiguration, refurbishment, and other maintenance or service.

Each of the processes of aircraft manufacturing and service method 1300 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 14, an illustration of an aircraft is depicted in the form of a block diagram in which an illustrative embodiment may be implemented. In this example, aircraft 1400 is produced by aircraft manufacturing and service method 1300 in FIG. 13 and may include airframe 1402 with plurality of systems 1404 and interior 1406. Examples of systems 1404 include one or more of propulsion system 1408, electrical system 1410, hydraulic system 1412, and environmental system 1414. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 1300 in FIG. 13. One or more illustrative embodiments may be used during component and subassembly manufacturing 1306. For example, structure 206 in FIG. 2 may be formed using tool 202 during component and subassembly manufacturing 1306. Further, structure 206 may also be used to perform replacements during maintenance and service 1314. For example, aircraft 1400 may be inspected during scheduled maintenance for aircraft 1400. Structure 206 may be part of aircraft 1400 such as part of airframe 1402 or systems 1404.

The illustrative embodiments provide a method and apparatus for forming a thermoplastic structure. Specifically, the illustrative embodiments provide a method and apparatus for forming a thermoplastic structure using inductive heating. A structure comprises thermoplastic material. The thermoplastic material may comprise braided thermoplastic material 238, tacked thermoplastic material 240, or both, as seen in FIG. 2. By using plurality of induction coils 222 and number of die liners 226 of tool 202, structure 206 may be consolidated, as seen in FIG. 2. During consolidation, number of die liners 226 may heat in response to a magnetic field generated by plurality of induction coils 222. Further, during consolidation, second material 246 in mandrel 242 may heat in response to a magnetic field generated by plurality of induction coils 222, as seen in FIG. 2. Forming tool 208 shown in FIG. 2 may provide a compressive force during consolidation.

By forming thermoplastic structures according to the illustrative embodiments, manufacturing time may be decreased. By forming thermoplastic structures according to illustrative embodiments, manufacturing costs for the structures may be decreased. Further, the illustrative embodiments may create thermoplastic structures with closed cross-sections. Additionally, the illustrative embodiments may create thermoplastic structures with ply drops.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method of forming a consolidated structure comprising:
   placing a thermoplastic material onto a metallic bladder to form a structure, wherein the metallic bladder comprises aluminum, an aluminum alloy, magnesium or a magnesium alloy, and wherein the metallic bladder substantially surrounds a mandrel that comprises a first material that is soluble and a metallic tube that has a hollow cross-section and comprising a first material that is configured to generate heat in response to a magnetic field;

positioning the structure within a tool, the tool having a number of die liners comprising a second material that is configured to generate heat in response to the magnetic field;

applying a magnetic field to heat the number of die liners and the metallic tube to a Curie temperature of the of die liners, the Curie temperature of the of die liners corresponding to a consolidation temperature for the structure;

applying the magnetic field to continue heating the metallic tube after the number of die liners have become nonmagnetic and above the Curie temperature of the of die liners;

pressurizing the metallic bladder at the consolidation temperature to expand the metallic-bladder and impart an internal compressive force on the structure; and consolidating the structure at the consolidation temperature to form the consolidated structure.

2. The method of claim 1, wherein placing the thermoplastic material onto the mandrel to form the structure comprises:

placing a braided thermoplastic material over the-metallic bladder.

3. The method of claim 2, wherein placing the thermoplastic material onto the metallic bladder to form the structure further comprises:

placing a tacked thermoplastic material over the braided thermoplastic material on the metallic bladder, the tacked thermoplastic material laid down using laser assisted fiber placement equipment.

4. The method of claim 1 further comprising:
cooling the consolidated structure in the tool.

5. The method of claim 4, further comprising:
removing the consolidated structure from the tool.

6. The method of claim 1 further comprising:
dissolving the first material from within the consolidated structure.

7. The method of claim 1, wherein the number of die liners comprises a number of smart susceptors.

8. The method of claim 1 further comprising:
cutting the consolidated structure to form a plurality of products.

9. The method of claim 1, wherein the thermoplastic material is a resin infused fabric.

10. The method of claim 1, wherein the thermoplastic material is a resin infused tape.

11. The method of claim 1, wherein the thermoplastic material is a resin infused tow.

12. The method of claim 1, wherein the second material comprises a nickel-iron alloy.

13. The method of claim 1, wherein the second material comprises a nickel-iron-cobalt alloy.

14. The method of claim 1, wherein the second material comprises a nickel-iron-molybdenum alloy.

15. A method of forming a consolidated structure comprising:

placing a braided thermoplastic material onto a onto a metallic bladder to form a structure, wherein the metallic bladder comprises aluminum, an aluminum alloy, magnesium or a magnesium alloy, and wherein the metallic bladder substantially surrounds a mandrel that comprises a first material that is soluble and a metallic tube comprised of an aluminum or aluminum alloy that has a hollow cross-section and comprising a first material that is configured to generate heat in response to a magnetic field;

positioning the structure within a tool, the tool having a number of die liners comprising a second material that is configured to generate heat in response to the magnetic field;

applying a magnetic field to heat the number of die liners and the metallic tube to a Curie temperature of the of die liners, the Curie temperature of the of die liners corresponding to a consolidation temperature for the structure;

applying the magnetic field to continue heating the metallic tube after the number of die liners have become nonmagnetic and above the Curie temperature of the of die liners;

consolidating the structure at the consolidation temperature to form the consolidated structure; and dissolving the first material from within the consolidated structure.

16. The method of claim 15 further comprising:
cutting the consolidated structure to form a plurality of products.

17. The method of claim 16, wherein placing the thermoplastic material onto the mandrel to form the structure further comprises:

placing a tacked thermoplastic material over the braided thermoplastic material on the mandrel, the tacked thermoplastic material laid down using laser assisted fiber placement equipment.

18. The method of claim 15, wherein placing the thermoplastic material onto the mandrel to form the structure further comprises:

placing a tacked thermoplastic material over the braided thermoplastic material on the mandrel, the tacked thermoplastic material laid down using laser assisted fiber placement equipment.

19. The method of claim 15, wherein the thermoplastic material is a resin infused fabric.

20. The method of claim 15, wherein the thermoplastic material is a resin infused tape.

21. The method of claim 15, wherein the thermoplastic material is a resin infused tow.

22. The method of claim 15, wherein the second material comprises a nickel-iron alloy.

23. The method of claim 15, wherein the second material comprises a nickel-iron-cobalt alloy.

24. The method of claim 15, wherein the second material comprises a nickel-iron-molybdenum alloy.

\* \* \* \* \*